United States Patent
Patra et al.

(10) Patent No.: US 12,073,155 B2
(45) Date of Patent: Aug. 27, 2024

(54) METHOD AND SYSTEM FOR BUILDING HARDWARE IMAGES FROM HETEROGENEOUS DESIGNS FOR ELECTRONIC SYSTEMS

(71) Applicant: Xilinx, Inc., San Jose, CA (US)

(72) Inventors: Anindita Patra, Amherst, NH (US); Ali Behboodian, Fremont, CA (US); Michael Gill, Campbell, CA (US)

(73) Assignee: XILINX, INC., San Jose, CA (US)

( * ) Notice: Subject to any disclaimer, the term of this patent is extended or adjusted under 35 U.S.C. 154(b) by 228 days.

(21) Appl. No.: 17/692,602

(22) Filed: Mar. 11, 2022

(65) Prior Publication Data

US 2023/0289500 A1 Sep. 14, 2023

(51) Int. Cl.
*G06F 30/31* (2020.01)
*G06F 30/34* (2020.01)

(52) U.S. Cl.
CPC .............. *G06F 30/31* (2020.01); *G06F 30/34* (2020.01)

(58) Field of Classification Search
CPC ....................................................... G06F 30/31
USPC ........................................................ 716/116
See application file for complete search history.

(56) References Cited

U.S. PATENT DOCUMENTS 10,977,018 B1 4/2021 Hwang et al.
2019/0034363 A1* 1/2019 Palermo .............. G06F 13/4022

* cited by examiner

*Primary Examiner* — Eric D Lee
(74) *Attorney, Agent, or Firm* — Crawford Maunu PLLC

(57) ABSTRACT

Automatically generating a hardware image based on programming model types includes determining by a design tool, types of programming models used in specifications of blocks of a circuit design, in response to a user control input to generate a hardware image to configure a programmable integrated circuit (IC). The design tool can generate a model-type compiler script for each of the types of programming models. Each compiler script initiates compilation of blocks having specifications based on one of the types of programming model into an accelerator representation. The design tool can generate a build script configured to execute the compiler scripts and link the accelerator representations into linked accelerator representations. Execution of the build script builds a hardware image from the linked accelerator representations for configuring the programmable IC to implement a circuit according to the circuit design.

20 Claims, 4 Drawing Sheets

METHOD AND SYSTEM FOR BUILDING HARDWARE IMAGES FROM HETEROGENEOUS DESIGNS FOR ELECTRONIC SYSTEMS

TECHNICAL FIELD

The disclosure generally relates to processing electronic circuit designs.

BACKGROUND

An application implemented on a heterogeneous hardware platform can be designed using different modules that are implemented on different subsystems of the platform. For example, an ACAP (Adaptive Compute Acceleration Platform) from Xilinx, Inc., is a heterogeneous hardware platform and includes a programmable logic subsystem, a processor subsystem, and data processing engine ("DPE") array subsystem. The modules, which can be targeted to different subsystems, can be specified using different programming models, such as Simulink, RTL, C/C++, DPE, and high-level (non-RTL) functional blocks as present in Xilinx Vitis Model Composer. Once instantiated in a design, the modules can be connected to build the application in a graphical tool, such as Xilinx Vitis Model Composer.

The application can then be simulated across different simulators, such as Simulink, X86 simulator and DPE simulator, using input test vectors and verifying the results. Once proper behavior has been verified based on simulation, the next step is to verify whether or not the application as implemented on the target hardware platform will produce same results as the simulation results based on the same input test vectors.

Building a hardware image for testing the application on the target hardware platform has been complicated, time-consuming, and thereby error prone. Modules specified according to different programming models require writing scripts to compile the modules and specifying the connectivity between the modules. For modules specified for implementation on DPEs, for example, specifying connectivity can involve writing a lengthy connectivity graph specification.

Once the modules have been compiled into accelerator representations, which are suitable for configuring programmable hardware resources of the target device, the accelerator representations can be linked together into a complete hardware image for the target device.

Testing the application on the target hardware can introduce additional possibilities for error. Testing the application has involved writing a test bench application that uses compatible datatypes, inputs, outputs and driver values, specifying the input test vectors in the format expected by the hardware device, specifying expected output data in a format compatible with the hardware device, and specifying comparison of the expected output data with result data generated by the application on the hardware device.

SUMMARY

A disclosed method of automatically generating a hardware image based on programming model types includes determining by a design tool, types of programming models used in specifications of blocks of a circuit design, in response to a user control input to generate a hardware image to configure a programmable integrated circuit (IC). The method includes generating, in response to determining the types of programming models, a model-type compiler script for each of the types of programming models. Each compiler script initiates compilation of blocks having specifications based on one of the types of programming model into an accelerator representation. The method includes generating, in response to generating the compiler scripts, a build script configured to execute the compiler scripts and link the accelerator representations into linked accelerator representations. The method includes executing the build script and building a hardware image from the linked accelerator representations for configuring the programmable IC to implement a circuit according to the circuit design.

A disclosed system includes one or more computer processors configured to execute program code and a memory arrangement. The memory arrangement is configured with instructions of a design tool that when executed by the one or more computer processors cause the one or more computer processors to perform operations including determining types of programming models used in specifications of blocks of a circuit design, in response to a user control input to generate a hardware image to configure a programmable integrated circuit (IC). The operations include generating, in response to determining the types of programming models, a model-type compiler script for each of the types of programming models. Each compiler script initiates compilation of blocks having specifications based on one of the types of programming model into an accelerator representation. The operations include generating, in response to generating the compiler scripts, a build script configured to execute the compiler scripts and link the accelerator representations into linked accelerator representations. The operations include executing the build script and building a hardware image from the linked accelerator representations for configuring the programmable IC to implement a circuit according to the circuit design.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

Figure 1:
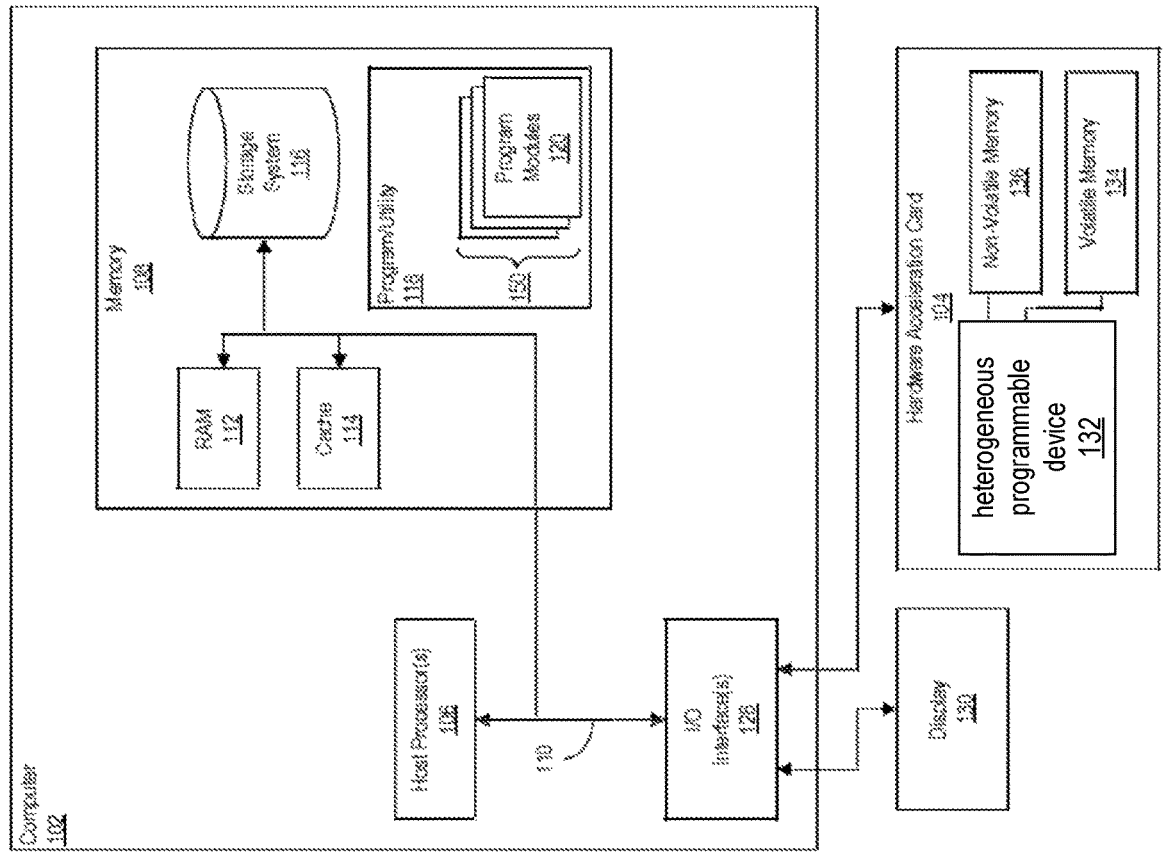
FIG. 1 illustrates an example computing system having a computer for use with the inventive arrangements described within this disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Using current approaches, the level of effort involved in building a hardware image from a heterogeneous design and providing a corresponding test bench increases application development costs. This disclosed methods and systems provide a simplified tool flow that automatically supplements the heterogeneous design with inferred connectivity, generates programming model-specific compiler scripts and a build script to generate configuration data for making a hardware implementation, and generates a test bench, along with hardware compatible input test vectors and expected result data.

FIG. 1 illustrates an example computing system 100 having a computer 102 (sometimes referred to herein as a "host" or "host system") for use with the inventive arrangements described in this disclosure. Computer 102 may include, but is not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures. Example bus structures include a memory bus, a peripheral bus, a graphics bus, and a processor or local bus. The bus structure may be implemented using any of a variety of available bus architectures. By way of example, and not limitation, such bus architectures include Peripheral Component Interconnect (PCI) bus, PCI Express (PCIe) bus, Advanced Microcontroller Bus Architecture (AMBA) Advanced Extensible Interface (AXI) bus, and/or other known buses.

Computer 102 typically includes a variety of computer readable media. Such media may be any available media that is accessible by computer 102 and may include any combination of volatile media, non-volatile media, removable media, and/or non-removable media.

Memory 108 may include computer readable media in the form of volatile memory, such as random-access memory (RAM) 112 and/or cache memory 114. Computer 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include one or more computer program products having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by computer 102.

In one aspect, program modules 120 may implement a development environment 150 for a heterogeneous device. The development environment 150 may include a design tool for preparing a heterogeneous design and building a hardware image, one or more compilers capable of operating on high level program code (e.g., source code), hardware description language(s), and/or graphs to generate configuration data (e.g., one or more configuration bitstreams) and executable program code. Program modules 120, for example, may include software that is capable of performing a design flow (e.g., synthesis, placement, routing, and/or bitstream generation) on a circuit design and generating object code. In this regard, computer 102 serves as an example of an Electronic Design Automation (EDA) system that is capable of generating configuration bitstreams from user applications. The configuration data and executable program code may be loaded into a heterogeneous device 132 to implement the user application therein.

In another aspect, program modules 120 may also implement a software stack. The software stack, when executed by computer 102, may implement a runtime environment capable of performing operations described herein in communicating with hardware acceleration card 104 at runtime. For example, program modules 120 may include a driver or daemon capable of communicating with heterogeneous device 132. Thus, computer 102 may operate as a host that is capable of executing a runtime software system capable of connecting to hardware acceleration card 104.

In another example implementation, computer 102 is used for purposes of developing, e.g., compiling, the user application. Heterogeneous device 132 may include one or more processors therein providing a complete embedded system. In that case, the one or more processors of heterogeneous device 132 may execute the runtime software system such that the one or more processors embedded in heterogeneous device 132 operate as the host system or host processor as the case may be.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 102 may include one or more Input/Output (I/O) interfaces 128 communicatively linked to bus 110. I/O interface(s) 128 allow computer 102 to communicate with external devices, couple to external devices that allow user(s) to interact with computer 102, couple to external devices that allow computer 102 to communicate with other computing devices, and the like. For example, computer 102 may be communicatively linked to a display 130 and to hardware acceleration card 104 through I/O interface(s) 128. Computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which computer 102 communicates with hardware acceleration card 104 is a PCIe adapter. Hardware acceleration card 104 may be implemented as a circuit board that couples to computer 102. Hardware acceleration card 104 may, for example, be inserted into a card slot, e.g., an available bus and/or PCIe slot, of computer 102.

Hardware acceleration card 104 includes heterogeneous device 132. Hardware acceleration card 104 also includes volatile memory 134 coupled to heterogeneous device 132 and a non-volatile memory 136 also coupled to heterogeneous device 132. Volatile memory 134 may be implemented as a RAM that is external to heterogeneous device 132, but is still considered a "local memory" of heterogeneous device 132, whereas memory 108, being within computer 102, is not considered local to heterogeneous device 132. In some implementations, volatile memory 134 may include multiple gigabytes of RAM. Non-volatile memory 136 may be implemented as flash memory. Non-volatile memory 136 is also external to heterogeneous device 132 and may be considered local to heterogeneous device 132.

FIG. 1 is not intended to suggest any limitation as to the scope of use or functionality of the examples described herein. Computer 102 is an example of computer hardware (e.g., a system) that is capable of performing the various operations described within this disclosure relating to implementing user applications and/or runtime interactions with hardware acceleration card 104 and/or heterogeneous device 132. Heterogeneous device 132, for example, may be implemented as a programmable IC.

Computer 102 is only one example implementation of a computer that may be used with a hardware acceleration card. Computer 102 is shown in the form of a computing device, e.g., a computer or server. Computer 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs and/or heterogeneous devices) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using computing system 100 or other suitable data processing system, generally support the FPGA-as-a-Service (FaaS) model. In the FaaS model, user functions are hardware accelerated as circuit designs implemented within programmable ICs and/or heterogeneous devices operating under control of the (host) data processing systems. Other examples of cloud computing models are described in the National Institute of Standards and Technology (NIST) and, more particularly, the Information Technology Laboratory of NIST.

Computer 102 is operational with numerous other general-purpose or special-purpose computing system environments or configurations. Examples of computing systems, environments, and/or configurations that may be suitable for use with computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
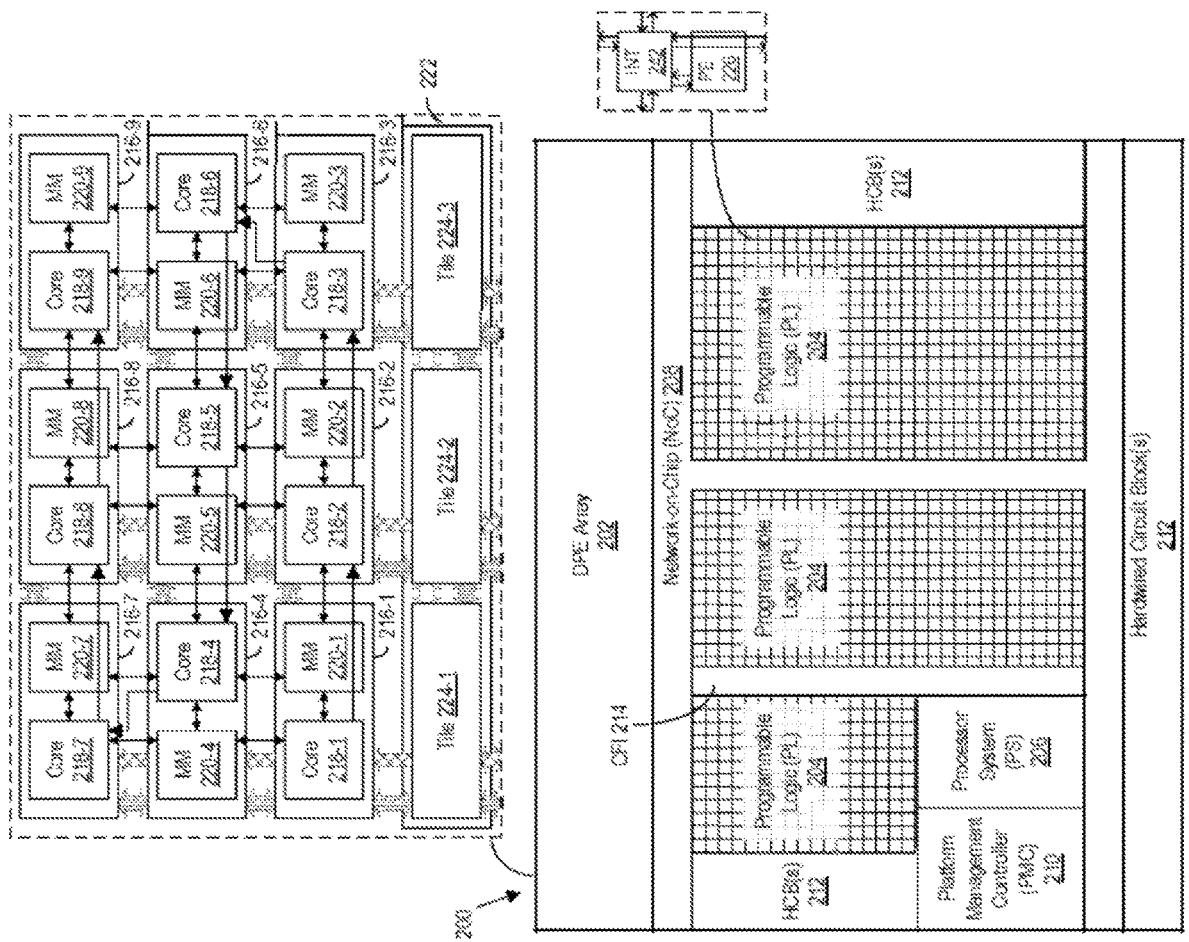
FIG. 2 illustrates an example architecture for heterogeneous device.

FIG. 2 illustrates an example architecture 200 for heterogeneous device (device) 132. Architecture 200 may be used to implement a programmable IC and an adaptive system. In one aspect, architecture 200 may be used to implement a System-on-Chip (SoC). In the example of FIG. 2, architecture 200 is implemented on a single die provided within a single integrated package. In other examples, architecture 200 may be implemented using a plurality of interconnected dies where the various programmable circuit resources and/or subsystems illustrated in FIG. 2 are implemented across the different interconnected dies.

In the example, architecture 200 includes a data processing engine (DPE) array 202, programmable logic (PL) 204, a processor system (PS) 206, a Network-on-Chip (NoC) 208, a platform management controller (PMC) 210, and one or more hardwired circuit blocks (HCBs) 212. A configuration frame interface (CFI) 214 is also included. For purposes of discussion, each of DPE array 202, PL 204, PS 206, NoC 208, PMC 210, and each HCB 212 is an example of a subsystem of architecture 200.

DPE array 202 is implemented as a plurality of interconnected and programmable data processing engines (DPEs) 216. DPEs 216 may be arranged in an array and are hardwired. Each DPE 216 can include one or more cores 218 and a memory module (abbreviated "MM" in FIG. 2) 220. In one aspect, each core 218 is capable of executing program code stored in a core-specific program memory contained within each respective core (not shown). Each core 218 is capable of directly accessing the memory module 220 within the same DPE 216 and the memory module 220 of any other DPE 216 that is adjacent to the core 218 of the DPE 216 in the up, down, left, and right directions. For example, core 218-5 is capable of directly reading and/or writing (e.g., via respective memory interfaces not shown) memory modules 220-5, 220-8, 220-6, and 220-2. Core 218-5 sees each of memory modules 220-5, 220-8, 220-6, and 220-2 as a unified region of memory (e.g., as a part of the local memory accessible to core 218-5). This facilitates data sharing among different DPEs 216 in DPE array 202. In other examples, core 218-5 may be directly connected to memory modules 220 in other DPEs.

DPEs 216 are interconnected by programmable DPE interconnect circuitry. The programmable DPE interconnect circuitry may include one or more different and independent networks. For example, the programmable DPE interconnect circuitry may include a streaming network formed of streaming connections (shaded arrows), a memory mapped network formed of memory mapped connections (cross-hatched arrows).

Loading configuration data into control registers of DPEs 216 by way of the memory mapped connections allows each DPE 216 and the components therein to be controlled independently. DPEs 216 may be enabled/disabled on a per-DPE basis. Each core 218, for example, may be configured to access the memory modules 220 as described or only a subset thereof to achieve isolation of a core 218 or a plurality of cores 218 operating as a cluster. Each streaming connection may be configured to establish logical connections between only selected ones of DPEs 216 to achieve isolation of a DPE 216 or a plurality of DPEs 216 operating as a cluster. Because each core 218 may be loaded with program code specific to that core 218, each DPE 216 is capable of implementing one or more different kernels therein.

In other aspects, the programmable DPE interconnect circuitry within DPE array 202 may include additional independent networks such as a debug network that is independent (e.g., distinct and separate from) the streaming connections and the memory mapped connections, and/or an event broadcast network. In some aspects, the debug network is formed of memory mapped connections and/or is part of the memory mapped network.

Cores 218 may be directly connected with adjacent cores 218 via core-to-core cascade connections. In one aspect, core-to-core cascade connections are unidirectional and direct connections between cores 218 as pictured. In another aspect, core-to-core cascade connections are bidirectional and direct connections between cores 218. In general, core-to-core cascade connections generally allow the results stored in an accumulation register of a source core to be provided directly to an input of a target or load core. Activation of core-to-core cascade interfaces may also be controlled by loading configuration data into control registers of the respective DPEs 216.

In an example implementation, DPEs 216 do not include cache memories. By omitting cache memories, DPE array 202 is capable of achieving predictable, e.g., deterministic, performance. Further, significant processing overhead is avoided since maintaining coherency among cache memories located in different DPEs 216 is not required. In a further example, cores 218 do not have input interrupts. Thus, cores 218 are capable of operating uninterrupted. Omitting input interrupts to cores 218 also allows DPE array 202 to achieve predictable, e.g., deterministic, performance.

SoC interface block 222 operates as an interface that connects DPEs 216 to other resources of architecture 200. In the example of FIG. 2, SoC interface block 222 includes a plurality of interconnected tiles 224 organized in a row. In particular embodiments, different architectures may be used to implement tiles 224 within SoC interface block 222 where each different tile architecture supports communication with different resources of architecture 200. Tiles 224 are connected so that data may be propagated from one tile to another bi-directionally. Each tile 224 is capable of operating as an interface for the column of DPEs 216 directly above.

Tiles 224 are connected to adjacent tiles, to DPEs 216 immediately above, and to circuitry below using the streaming connections and the memory mapped connections as shown. Tiles 224 may also include a debug network that connects to the debug network implemented in DPE array 202. Each tile 224 is capable of receiving data from another source such as PS 206, PL 204, and/or another HCB 212. Tile 224-1, for example, is capable of providing those portions of the data, whether application or configuration, addressed to DPEs 216 in the column above to such DPEs 216 while sending data addressed to DPEs 216 in other columns on to other tiles 224, e.g., 224-2 or 224-3, so that such tiles 224 may route the data addressed to DPEs 216 in their respective columns accordingly.

In one aspect, SoC interface block 222 includes two different types of tiles 224. A first type of tile 224 has an architecture configured to serve as an interface only between DPEs 216 and PL 204. A second type of tile 224 is has an architecture configured to serve as an interface between DPEs 216 and NoC 208 and also between DPEs 216 and PL 204. SoC interface block 222 may include a combination of tiles of the first and second types or tiles of only the second type.

PL 204 is circuitry that may be programmed to perform specified functions. As an example, PL 204 may be implemented as field programmable gate array (FPGA) type of circuitry. PL 204 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 204 is highly configurable unlike hardwired circuitry. Each programmable circuit block of PL 204 typically includes a programmable element 226 (e.g., a functional element) and a programmable interconnect 242. The programmable interconnects 242 provide the highly configurable topology of PL 204. The programmable interconnects 242 may be configured on a per wire basis to provide connectivity among the programmable elements 226 of programmable circuit blocks of PL 204 and is configurable on a per-bit basis (e.g., where each wire conveys a single bit of information) unlike connectivity among DPEs 216, for example.

Examples of programmable circuit blocks of PL 204 include configurable logic blocks having look-up tables and registers. Unlike hardwired circuitry described below and sometimes referred to as hard blocks, these programmable circuit blocks have an undefined function at the time of manufacture. PL 204 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 204, are numerous and intermingled with the other programmable circuit blocks of PL 204. These circuit blocks may also have an architecture that generally includes a programmable interconnect 242 and a programmable element 226 and, as such, are part of the highly configurable topology of PL 204.

Prior to use, PL 204, e.g., the programmable interconnect and the programmable elements, must be programmed or "configured" by loading data referred to as a configuration bitstream into internal configuration memory cells therein. The configuration memory cells, once loaded with a configuration bitstream, define how PL 204 is configured, e.g., the topology, and operates (e.g., particular functions performed). Within this disclosure, a "configuration bitstream" is not equivalent to program code executable by a processor or computer.

PS 206 is implemented as hardwired circuitry that is fabricated as part of architecture 200. PS 206 may be implemented as, or include, any of a variety of different processor types each capable of executing program code. For example, PS 206 may be implemented as an individual processor, e.g., a single core capable of executing program code. In another example, PS 206 may be implemented as a multi-core processor. In still another example, PS 206 may include one or more cores, modules, co-processors, I/O interfaces, and/or other resources. PS 206 may be implemented using any of a variety of different types of architectures. Example architectures that may be used to implement PS 206 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code. In one aspect, PS 206 may include one or more application processors and one or more real-time processors.

NoC 208 is a programmable interconnecting network for sharing data between endpoint circuits in architecture 200. The endpoint circuits can be disposed in DPE array 202, PL 204, PS 206, and/or selected HCBs 212. NoC 208 can include high-speed data paths with dedicated switching. In an example, NoC 208 includes one or more horizontal paths, one or more vertical paths, or both horizontal and vertical path(s). The arrangement and number of regions shown in FIG. 2 is merely an example. NoC 208 is an example of the common infrastructure that is available within architecture 200 to connect selected components and/or subsystems.

Within NoC 208, the nets that are to be routed through NoC 208 are unknown until a user application is created for implementation within architecture 200. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of architecture 200 (e.g., is hardwired) and, while not physically modifiable, may be programmed to establish connectivity between different master circuits and different slave circuits of a user application. NoC 208, upon power-on, does not implement any data paths or routes therein. Once configured, e.g., by PMC 210, however, NoC 208 implements data paths or routes between endpoint circuits.

PMC 210 is responsible for managing architecture 200. PMC 210 is a subsystem within architecture 200 that is capable of managing the programmable circuit resources across the entirety of architecture 200. PMC 210 is capable of maintaining a safe and secure environment, booting architecture 200, and managing architecture 200 during operation. For example, PMC 210 is capable of providing unified and programmable control over power-up, boot/configuration, security, power management, safety monitoring, debugging, and/or error handling for the different programmable circuit resources of architecture 200 (e.g., DPE array 202, PL 204, PS 206, and NoC 208). PMC 210 operates as a dedicated platform manager that decouples PS 206 from PL 204. As such, PS 206 and PL 204 may be managed, configured, and/or powered on and/or off independently of one another.

In one aspect, PMC 210 is capable of operating as a Root-of-Trust for the entirety of architecture 200. As an example, PMC 210 is responsible for authenticating and/or validating device images containing configuration data and/or program code for any of the programmable resources of architecture 200 that may be loaded into architecture 200. PMC 210 is further capable of protecting architecture 200 against tampering during operation. By operating as the Root-of-Trust for architecture 200, PMC 210 is capable of monitoring operation of PL 204, PS 206, and/or any other programmable circuit resources that may be included in architecture 200. The Root-of-Trust capabilities, as performed by PMC 210, are distinct and separate from PS 206 and PL 204 and/or any operations performed by the PS 206 and/or PL 204.

In one aspect, PMC 210 is operated on a dedicated power supply. As such, PMC 210 is powered by a power supply that is separate and independent from the power supply of PS 206 and the power supply of PL 204. This power independence allows PMC 210, PS 206, and PL 204 to be protected from one another in terms of electrical noise and glitches. Further, one or both of PS 206 and PL 204 may be powered down (e.g., suspended or placed in hibernate mode) while PMC 210 continues to operate. This capability allows any portions of architecture 200, e.g., PL 204, PS 206, NoC 208, etc., that have been powered down to wake and be restored to an operational state more quickly and without the need for the entirety of architecture 200 to undertake a complete power-up and boot process.

PMC 210 may be implemented as a processor with dedicated resources. PMC 210 may include multiple redundant processors. The processors of PMC 210 are capable of executing firmware. Use of firmware (e.g., executable program code) supports configurability and segmentation of global features of architecture 200 such as reset, clocking, and protection to provide flexibility in creating separate processing domains (which are distinct from "power domains" that may be subsystem-specific). Processing domains may involve a mixture or combination of one or more different programmable circuit resources of architecture 200 (e.g., wherein the processing domains may include different combinations or devices from DPE array 202, PS 206, PL 204, NoC 208, and/or other HCB(s) 212).

HCBs 212 include special-purpose circuit blocks fabricated as part of architecture 200. Though hardwired, HCBs 212 may be configured by loading configuration data into control registers to implement one or more different modes of operation. Examples of HCBs 212 may include input/output (I/O) blocks, transceivers for sending and receiving signals to circuits and/or systems external to architecture 200, memory controllers, or the like. Examples of different I/O blocks may include single-ended and pseudo differential I/Os. Examples of transceivers may include high-speed differentially clocked transceivers. Other examples of HCBs 212 include, but are not limited to, cryptographic engines, digital-to-analog converters (DACs), analog-to-digital converters (ADCs), and the like. In general, HCBs 212 are application-specific circuit blocks.

CFI 214 is an interface through which configuration data, e.g., a configuration bitstream, may be provided to PL 204 to implement different user-specified circuits and/or circuitry therein. CFI 214 is coupled to and accessible by PMC 210 to provide configuration data to PL 204. In some cases, PMC 210 is capable of first configuring PS 206 such that PS 206, once configured by PMC 210, may provide configuration data to PL 204 via CFI 214. In one aspect, CFI 214 has a built-in cyclic redundancy checking (CRC) circuitry (e.g., CRC 32-bit circuitry) incorporated therein. As such, any data that is loaded into CFI 214 and/or read back via CFI 214 may be checked for integrity by checking the values of codes attached to the data.

The various programmable circuit resources illustrated in FIG. 2 may be programmed initially as part of a boot process for architecture 200. During runtime, the programmable circuit resources may be reconfigured. In one aspect, PMC 210 is capable of initially configuring DPE array 202, PL 204, PS 206, and NoC 208. At any point during runtime, PMC 210 may reconfigure all or a portion of architecture 200. In some cases, PS 206 may configure and/or reconfigure PL 204 and/or NoC 208 once initially configured by PMC 210.

In another aspect, a heterogeneous device includes dedicated on-chip circuitry that exposes I/O interfaces (e.g., AXI bus interfaces or other communication bus interfaces) to other portions of the heterogeneous device. For example, referring to the example of FIG. 2, architecture 200 may include dedicated on-chip circuitry that exposes AXI interfaces to DPE array 202, PL 204, NoC 208, DSP blocks in PL

204, HCBs 212, and/or other programmable I/O included in architecture 200. Development environment 150, as described within this disclosure, is capable of providing a uniform mechanism for programming such accelerator systems that include such dedicated on-chip circuitry whether the host processor (e.g., the host system) is part of a distinct host computer (e.g., computer 102 of FIG. 1) or is implemented as one or more processors embedded in heterogeneous device 132 (e.g., PS 206).

FIG. 2 is provided as an example of a heterogeneous device. In other examples, particular subsystems such as PS 206 may be omitted. For example, a heterogeneous device may include DPE array 202 in combination with PL 204. In another example, a heterogeneous device may include DPE array 202 in combination with NoC 208 and PL 204. One or more HCB(s) also may be included in the alternative examples described.

Figure 3:
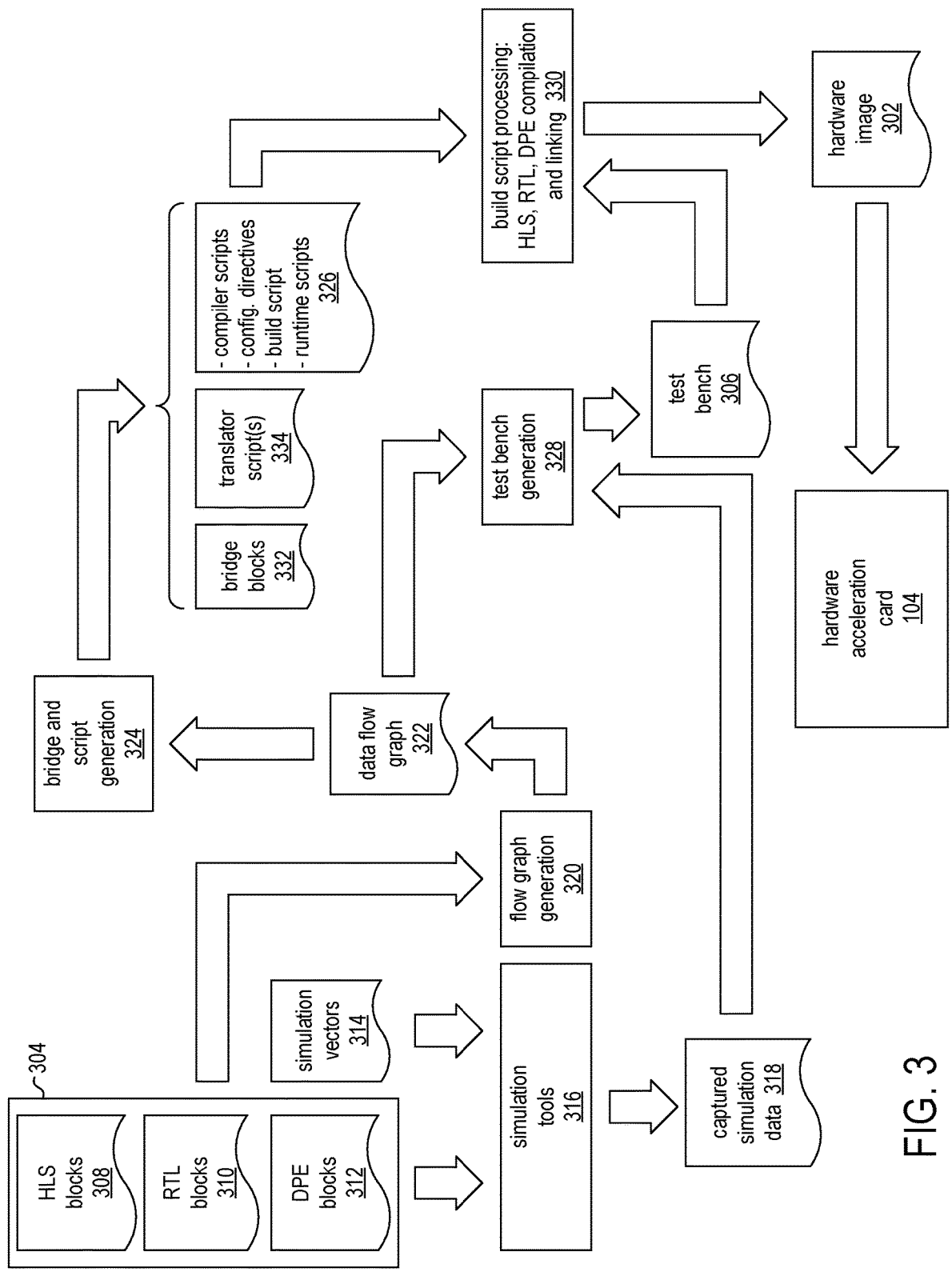
FIG. 3 shows a dataflow diagram of a system for building a hardware image from a heterogeneous design and providing a corresponding test bench.

FIG. 3 shows a dataflow diagram of a system for building a hardware image 302 from a heterogeneous design 304 and providing a corresponding test bench 306. The heterogeneous design includes modules or "blocks" specified according to different programming models. The exemplary design includes high-level synthesis (HLS) blocks 308, register transfer level (RTL) blocks 310, and DPE blocks 312. The HLS blocks can be blocks specified in a high-level language, such as C or C++, for example.

The blocks of the design can be combined by importing the collection of blocks into a design tool, such as the Vitis Model Composer tool from Xilinx, Inc. For context, the Vitis Model Composer tool is built on MATLAB/Simulink environment from The MathWorks, Inc. Within the design tool, the designer can connect the blocks to build the application. In addition, the designer can instantiate and connect suitable simulation blocks to provide input test vectors and visualize and log output data. The designer can indicate to the design tool the target hardware platform on which the application is to be implemented. The RTL blocks can be mapped to parameterizable RTL modules, such as those in a library developed by a party other than the designer. The designer can specify parameter values such as the target hardware platform, the implementation language, clock rate, AXI bus interface parameters, etc.

The designer can create simulation test vectors 314 and provide the design 304 and simulation vectors to simulation tool 316. The simulation tool creates simulation models and simulates the application, logging input simulation vectors and output result data from the simulation as captured simulation data 318. The simulation can be part of an iterative cycle in which the design 304 is modified in response to the errors discovered during simulation, the application is simulated using the modified design, and the process repeated until the simulation results are satisfactory.

According to the disclosed methods and systems, once simulation results are satisfactory and in response to a simple input command, the system can, without designer intervention or further efforts, automatically generate compiler scripts for the different blocks, a build script (e.g., a makefile) to execute the compiler scripts, a test bench application and data, and a hardware image from the compiled binary object files and the test bench application.

The system includes flow graph generation logic 320, which takes the different blocks 308, 310, and 312 of the design 304 and generates a data flow graph 322. The vertices of the dataflow graph represent the blocks 308, 310, and 312, along with blocks that specify input test vectors and any blocks for visualizing output data. The edges in the dataflow graph represent data communicated between the blocks and have associated data that specify the format and type of data (e.g., bit-width, address, float, int, etc.).

The bridge and script generation logic 324 extracts information from the dataflow graph 322 and based on the extracted information generates bridge blocks 332, scripts 326 for generating the hardware image 302, and translator script(s) 334. The bridge blocks, including, for example, blocks that represent data buffers, facilitate communication between different ones of the blocks 308, 310, and 312. One or more translator scripts 334 perform mathematical operations on data for input to the blocks and mathematical operations on data output from the blocks. The operations on the input data and output data transform the data (the captured simulation data 318), based on datatype and bit-width, from the format of simulation domain into a format suitable for the hardware domain. The scripts 326 for generating the hardware image 302 include compiler scripts, configuration directives, runtime scripts, and a build script.

The extracted information from the data flow graph 322 and used to automatically instantiate the bridge blocks 332, includes connectivity of blocks to off-chip memory 134. For example, inputs from the Simulink domain to DPEs are interpreted as reads from off-chip memory and implicate translation from memory mapped data to streaming data. Similarly, outputs from DPEs to the Simulink domain are interpreted as writes to the off-chip memory and implicate translation from streaming data to memory mapped data. Notably, for translation of memory mapped data to streaming data, the bridge and script generation logic 324 generates a first-type data mover block. The first-type data mover block adapts to the number and types of input and output ports and can be instantiated as an HLS block. For translation of streaming data to memory mapped data, the bridge and script generation logic 324 generates a second-type data mover block. The second-type data mover block adapts to the number and types of input and output ports and can be instantiated as an HLS block.

The extracted information from the data flow graph also includes the different programming models in which the blocks are specified; the subsystems (programmable logic, processor subsystem, or DPE array) of the hardware device on which the blocks will be implemented; the configuration of the blocks when mapped to hardware (i.e., specifications of input and output ports and input and output data types); and interconnectivity of the blocks. For specific subsystems (PL or DPE array) and their corresponding programming models (HLS or RTL or DPE), the bridge and script generation logic 324 generates compiler scripts suitable for the programming model. For example, for a PL subsystem written in a high-level language (e.g., C or C++), the generated compiler script will include HLS-specific compilation instructions; for a PL subsystem written in RTL, the generated compiler script will include a TCL script to extract information (bus-interface, addressing information) from the RTL block, and an XML file to describe the RTL block to the compiler. For a DPE subsystem written in a DPE programming model (e.g., using C or C++), the generated compiler script will include the dataflow graph for the DPE subsystem and invoke specific DPE-specific compiler. In addition, based on the subsystem type (such as PL or DPE) and programming model (such as, HLS or RTL or DPE) of the blocks, the compiler scripts will also specify the frequency requirements and any user-specified processing directives to the compilers.

In generating the translator script(s) 334, the bridge and script generation logic 324 uses extracted port information (such as name, datatype, and bit-width) of blocks that input test data and the expected result data (captured simulation data 318). The name, datatype and bit-width are used by the bridge and script generation logic to determine and specify the mathematical operations to be performed on the input test data and the expected result data for compatibility with the implemented circuit.

Based on the connectivity between blocks and the port information from the data flow graph 322, and compiler and pre-processor options, as specified by the user, the bridge and script generation logic 324 generates a configuration directive file. The configuration directive file is used to pass information that describes how the different blocks are connected to one another (which input is connected to which output), names and types of blocks, specific clocking options, and compiler or pre-processor options, and blocks to infer and instantiate. The connectivity information is used to stitch the blocks onto the user-specified hardware platform to generate the final hardware design.

The bridge and script generation logic 324 also generates a build script. The build script, which can be implemented as a makefile, initiates the compilation scripts, and linking process. In response to the design 304 having HLS blocks, the script generation logic specifies initiation of the HLS compiler script, in response to the design having RTL blocks, the script generation logic specifies initiation of the RTL compiler script, and in response to the design having DPE blocks, the script generation logic specifies initiation of the DPE compiler script. The script generation logic also specifies in the build script compilation of the test bench application. In addition, the script generation logic specifies in the build script the linking of the binary object files generated by the compilers into the hardware image 302.

The bridge and script generation logic 324 generates runtime scripts that when executed establish the runtime environment for testing. For example, the runtime environment can involve a runtime environment variable that indicates a particular platform to be configured and tested. The runtime environment setup also consists of updating "PATH" and "LD_LIBRARY_PATH" environment variables to specify particular compiler tools, such as Vivado, Vitis, and DPE compiler tools. The runtime scripts can also establish environment variables for interfacing between the test bench application and the hardware acceleration card 104 (e.g., "Xilinx Run Time (XRT)). After setting up the runtime environment variables, the runtime script launches the build script, which launches subsequent scripts and instructions, such as the translator script(s) 334, compiler scripts, and linking instruction to update the specified hardware platform, test bench generation logic 328 (e.g., a script) to generate the test bench 306 and finally scripts/commands to run hardware emulation or generate a hardware device image.

Test bench generation logic 328 inputs the simulation input and output data 318 that were captured during simulation and generates a script(s) (e.g., Bash and/or Python) that translates the simulation data into a format suitable for input and verification during testing on the hardware acceleration card 104. In an exemplary approach, the data can be written as header files, which are included in the test bench application.

The test bench generation logic also generates the test bench application, in C or C++, for example. In generating the test bench application, the logic includes the test data header files in the application, which when executed, inputs the specified test vectors to the circuit executing on the hardware acceleration card 104, captures output data, and compares the output to the expected results. The test bench generation logic 328 specifies in the application, a data initializer, a run-test method, and a main method, of which the inputs to and outputs from can be determined from the dataflow graph. Driver details and base-address information are not available until the linking of hardware binary objects is complete and the resulting files linked results are available. This information can be determined from the generated files and then is written to a header file that is included in the main test bench application.

The data initializer initializes output variables of the test bench application as hexadecimal values. The output variables refer to the output data from the implemented circuit, specifically the output data that is output from the DPE and written to off-chip memory 134.

The run-test, method reads the driver values and addressing information from the files generated during hardware platform linking phase and uses that information to refer to the input and output ports on the implemented circuit. The run-test method also controls the initialization, run and execution of the DPE dataflow graph by providing specific instructions to the DPE subsystem on the hardware device. The run-test method determines the point at which execution may be deemed complete or timed-out by examining status of control interface on the bridge blocks 332 and specified timeout limit. In addition, the run-test method compares the output results from the implemented circuit with the expected result data and reports pass or failure.

The main method controls the sequence of overall execution of the test bench application and invokes the data initializer and run-test methods. The main method also cleans up the hardware platform after the run of application on hardware device is completed or timed out. For different designs, these methods in the test bench application will have different numbers of inputs and outputs, and corresponding initialization and reference logic for the inputs and outputs will also vary.

The hardware image 302 generated as a result of the compilation and linking initiated by build script processing 330 (e.g., the make file) can be loaded onto the hardware acceleration card to configure the programmable device and execute the test bench. The test bench application executing on the programmable device can input the programmed test vectors and verify whether or not the generated output data matches the programmed, expected results.

Figure 4:
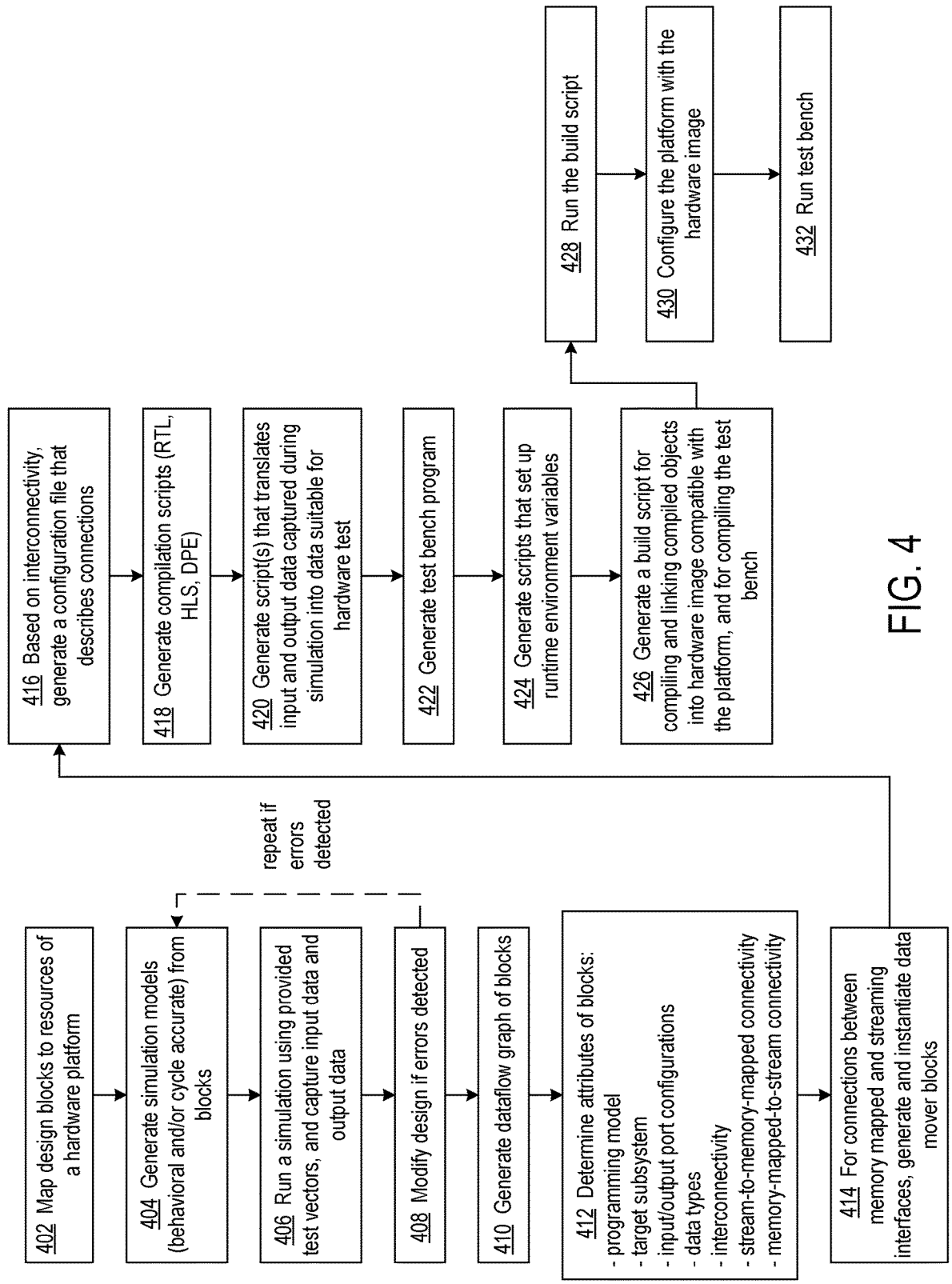
FIG. 4 shows a flowchart of an exemplary process for building a hardware image from a heterogeneous design and providing a corresponding test bench.

FIG. 4 shows a flowchart of an exemplary process for building a hardware image from a heterogeneous design and providing a corresponding test bench. At block 402, the blocks of a heterogeneous circuit design can be mapped by a design tool to hardware resources of a target programmable device, and at block 404 a design tool can generate simulation models based on the mappings and specifications of the blocks. The simulation models can be cycle accurate or behavioral, depending on simulation objectives. A simulation of the circuit defined by the design can be run at block 406 using specified test vectors. In running the simulation, the input vectors are captured along with output data generated by the simulated application. If errors are detected, at block 408 the designer can modify the design and repeat the simulation process. Once the generated output data matches the expected results, the application can be tested on the target hardware.

At block 410, the design tool generates a dataflow graph from the specified blocks of the design and blocks inferred based on connectivity between the specified blocks. The design tool at block 412 determines attributes of the blocks based on the dataflow graph. The attributes include the programming models in which the blocks are specified, the targeted subsystems of the hardware device, input/output port configuration, data types, interconnectivity of the blocks, stream-to-memory-mapped connectivity, and memory-mapped-to-stream connectivity.

For connections between memory mapped and streaming interfaces of blocks, at block 414 the design tool automatically instantiates data mover blocks. For example, in response to finding a connection in which data in off-chip memory is read by a DPE block, a data mover that converts memory mapped data to streaming data is instantiated. In response to finding a connection in which data is from a DPE block is written to off-chip memory, a data mover that converts streaming data to memory mapped data is instantiated.

At block 416, the design tool generates a configuration directive file based on the interconnectivity between blocks and designer-specified compiler and pre-processor options. The configuration directive file specifies connections between the inputs and outputs of the blocks, names and types of blocks, specific clocking options, and compiler or pre-processor options, and blocks to infer and instantiate.

At block 418 the design tool generates compilation scripts, which include an RTL compilation script for compiling RTL blocks, and HLS compilation script for compiling HLS blocks, and a DPE script for compiling DPE blocks.

The design tool at block 420 generates scripts that translate the input and output data that was captured during simulation into a format suitable for testing the circuit that implements the design. The translator scripts write the data to header files that can be included in the test bench application.

At block 422, the design tool generates the test bench application. The test bench application includes a data initializer, a run test method, and a main method, of which the inputs to and outputs from can be determined from the dataflow graph. Driver details and base-address information used by the test bench application are made available once the linking of hardware binary objects is complete. This information can be determined from the generated files and then written to a header file that is included in the main test bench application.

Runtime scripts are generated at block 424 by the design tool. The runtime scripts establish the runtime environment for testing, such as indicating a particular platform to be configured and tested.

The build script is generated by the design tool at block 426. The build script initiates the compilation scripts, and linking process. The build script can be run at block 428 to compile the design and link the binary objects, including the test bench application, into a hardware image.

At block 430, the hardware acceleration platform 104 can be configured with the hardware image, and at block 432 the test bench application can be executed to test the circuit implementation of the design.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for generating a hardware image from a heterogeneous design and providing a suitable test bench. Other aspects and features will be apparent to those skilled in the art from consideration of the specification. It is intended that the specification and drawings be considered as examples only, with a true scope of the invention being indicated by the following claims.

What is claimed is:

1. A method comprising:
   generating, by a design tool, in response to a user control input to generate a hardware image to configure an integrated circuit (IC), a respective compiler script for each type of different types of programming models used to specify blocks of a circuit design, wherein each compiler script initiates compilation of blocks specified in a corresponding type of the different types of programming models into a respective accelerator representation;
   generating, by the design tool, in response to generating the compiler scripts, a build script configured to execute the compiler scripts and link the accelerator representations into linked accelerator representations;
   executing the build script by the design tool; and
   building, by the design tool, the hardware image from the linked accelerator representations for configuring the IC to implement a circuit according to the circuit design.

2. The method of claim 1, wherein the types of programming models include two or more of a register transfer language, a high-level language, and a data flow graph.

3. The method of claim 1, further comprising instantiating a bridge block by the design tool in response to connections specified between a block of the blocks of the circuit design and off-chip memory.

4. The method of claim 3, wherein the bridge block is configured to translate memory mapped data to streaming data.

5. The method of claim 3, wherein the bridge block is configured to translate streaming data to memory mapped data.

6. The method of claim 1, wherein:
   a first type of the types of programming models targets programmable logic of the IC, and a second type of the types of programming models targets a processor subsystem of the IC; and
   the building the hardware image includes combining a configuration bitstream for configuring the programmable logic with program code that is executable by the processor subsystem.

7. The method of claim 1, wherein:
   a first type of the types of programming models targets programmable logic of the IC, and a second type of the types of programming models targets an array of data processing engines of the IC; and
   the building the hardware image includes combining a configuration bitstream for configuring the programmable logic with program code that is executable by a plurality of the data processing engines of the array.

8. The method of claim 1, further comprising:
   capturing simulation input and simulation output from a simulation based on the circuit design; and
   generating a test bench application that is executable on the IC, provides the simulation input as input vectors to the IC as configured with the hardware image, and determines correct operation of the configured IC based on comparison of output data from the IC to the simulation output.

9. The method of claim 8, further comprising generating a translator script configured to transform the simulation input and simulation output from a simulation format to a format compatible with the circuit implemented on the IC.

10. The method of claim 1, further comprising configuring the IC with the hardware image.

11. A system comprising:
one or more computer processors configured to execute program code; and
a memory arrangement coupled to the one or more computer processors, wherein the memory arrangement is configured with instructions of a design tool that when executed by the one or more computer processors cause the one or more computer processors to perform operations including:
  generating, in response to a user control input to generate a hardware image to configure an integrated circuit (IC), a respective compiler script for each type of different types of programming models used in specifications of blocks of a circuit design, wherein each compiler script initiates compilation of blocks specified in a corresponding type of the different types of programming models into a respective accelerator representation;
  generating, in response to generating the compiler scripts, a build script configured to execute the compiler scripts and link the accelerator representations into linked accelerator representations;
  executing the build script; and
  building the hardware image from the linked accelerator representations for configuring the IC to implement a circuit according to the circuit design.

12. The system of claim 11, wherein the types of programming models include two or more of a register transfer language, a high-level language, and a data flow graph.

13. The system of claim 11, wherein the memory arrangement is configured with instructions that when executed by the one or more computer processors cause the one or more computer processors to instantiate a bridge block in response to connections specified between a block of the blocks of the circuit design and off-chip memory.

14. The system of claim 13, wherein the bridge block is configured to translates memory mapped data to streaming data.

15. The system of claim 13, wherein the bridge block is configured to translate streaming data to memory mapped data.

16. The system of claim 11, wherein:
a first type of the types of programming models targets programmable logic of the IC, and a second type of the types of programming models targets a processor subsystem of the IC; and
the instructions for building the hardware image include instructions for combining a configuration bitstream for configuring the programmable logic with program code that is executable by the processor subsystem.

17. The system of claim 11, wherein:
a first type of the types of programming models targets programmable logic of the IC, and a second type of the types of programming models targets an array of data processing engines of the IC; and
the instructions for building the hardware image include instructions for combining a configuration bitstream for configuring the programmable logic with program code that is executable by a plurality of the data processing engines of the array.

18. The system of claim 11, wherein the memory arrangement is configured with instructions that when executed by the one or more computer processors cause the one or more computer processors to:
  capture simulation input and simulation output from a simulation based on the circuit design; and
  generate a test bench application that is executable on the IC, provides the simulation input as input vectors to the IC as configured with the hardware image, and determines correct operation of the configured IC based on comparison of output data from the IC to the simulation output.

19. The system of claim 18, wherein the memory arrangement is configured with instructions that when executed by the one or more computer processors cause the one or more computer processors to generate a translator script configured to transform the simulation input and simulation output from a simulation format to a format compatible with the circuit implemented on the IC.

20. The system of claim 11, wherein the memory arrangement is configured with instructions that when executed by the one or more computer processors cause the one or more computer processors to configure the IC with the hardware image.

* * * * *